United States Patent [19]

Santoro

[11] 4,146,277

[45] Mar. 27, 1979

[54] DESICCANT CAP

[76] Inventor: Dario S. Santoro, 5 Dogwood Dr., Stony Brook, N.Y. 11790

[21] Appl. No.: 920,391

[22] Filed: Jun. 29, 1978

[51] Int. Cl.² .................. B01D 53/14; B01D 53/18; F26B 21/08

[52] U.S. Cl. .................................. 312/31.1; 34/81; 55/384; 206/204; 215/227; 220/23

[58] Field of Search .............. 312/31.1, 31; 34/81; 220/23; 55/384; 206/204; 116/114 R; 215/227

[56] References Cited

U.S. PATENT DOCUMENTS 777,791 12/1904 Johnson .......................... 312/31.1
2,446,361 8/1948 Cliborn ........................... 312/31.1
2,487,620 4/1949 Waller ............................ 312/31.1

Primary Examiner—Mervin Stein
Assistant Examiner—Alex Grosz
Attorney, Agent, or Firm—Kevin Redmond

[57] ABSTRACT

A cap designed to provide a prolonged dehumidification of the contents of an associated container, an indication of the condition of the desiccant without exposing the contents, a rapid regeneration of the desiccant and a permanent isolation of the desiccant, by means of an inert, high isolation fiber, self-forming hermetic seals, and a high thermal conductivity case.

3 Claims, 2 Drawing Figures

DESICCANT CAP

BACKGROUND

1. Field

This invention pertains to dehumidification and, in particular, to dehumidification by means of a cap containing a desiccant.

2. Prior Art

There are many and varied applications for desiccant caps intended to provide a low humidity atmosphere within an associated container. Material requiring such protection include pharmaceuticals, seeds, food and machinery. The need for a reliable, long lasting cap can be exemplified by the effect of moisture on special seeds, such as ornamental cactus seed. A relatively small bottle of these seeds may cost as much as $500. A short period of exposure to a moist atmosphere results in the sprouting and eventual destruction of the seeds. Damage is similarly incurred with many expensive pharmaceuticals when exposed to a humid atmosphere for a relatively short period of time.

An equally large number of desiccant caps have been designed to overcome these problems as indicated by U.S. Pat. Nos. 1,425,790, 1,637,656, 1,655,248, 2,317,882, 2,446,361, 2,487,620, 2,548,168 and 2,676,078. These devices usually include a perforated metal holder for a desiccant which is either held together by a binder, such as asbestos, or separated from the container contents by a fiberglass sheet. In some cases the fiberglass is eliminated and only the perforated shield is used to isolate the desiccant from the container contents.

Sealing of the container is usually accomplished by merely tightening the cap without a gasket. The results of these approaches has been inadequate. The dehumidification is short lived and the desiccant and carcenogenic materials, such as asbestos and fiberglass commingle with the container contents. The contents are often food or pharmaceuticals, making the use of such devices a serious health and product liability problem.

In a number of these prior art devices, an indication of the state of the desiccant cannot be determined by visual inspection or the cap must be removed to determine the desiccant state, which results in exposing the contents to moisture merely to perform an inspection.

SUMMARY

It is an object of the present invention to provide means for prolonged dehumidification of the container. It is another object to provide high isolation and quick regeneration of the desiccant. It is another object to entirely eliminate carcinogens from the cap. It is another object to provide a filter which does not react with or otherwise affect the contents of the container. It is another object to provide an indication of the moisture content of the desiccant without removal of the cap.

In the present invention, an aluminum case, with a cylindrical opening passing completely through the case, contains within the opening a glass lens at one end and a porous ceramic filter at the other. A desiccant which provides an indication of its moisture content by a color change is placed in the chamber, formed by the opening and bounded at the ends by the filter and lens.

DETAILED DESCRIPTION

Figure 1:
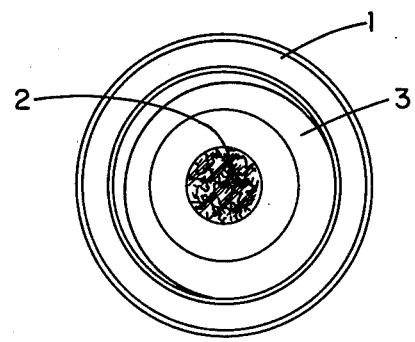
FIG. 1 is a top view of the present invention.
Figure 2:
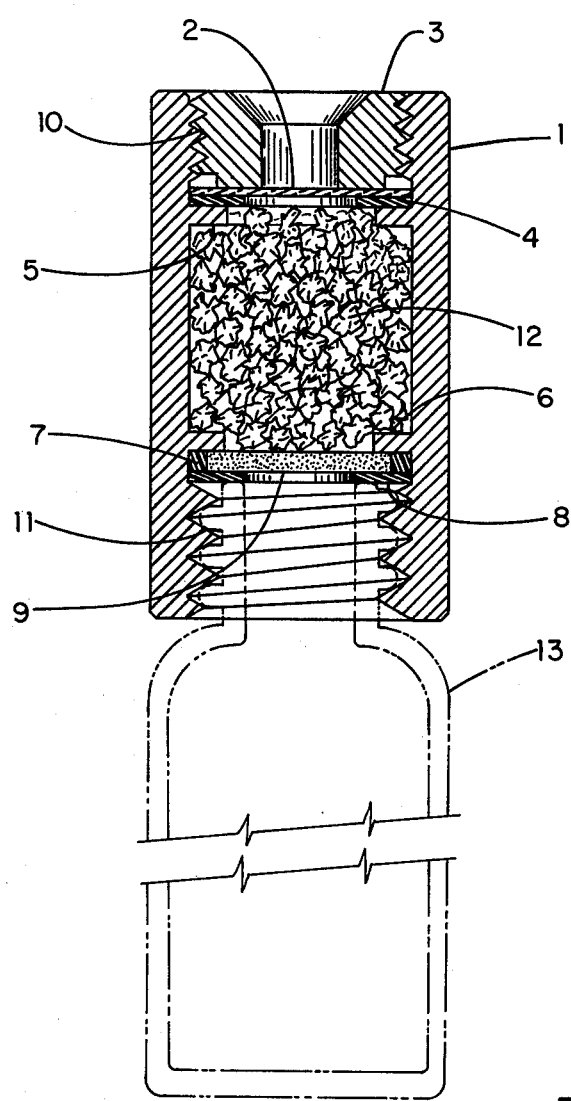
FIG. 2 is a cross sectional view of the present invention.

Referring to FIG. 2, the present invention comprises a case 1, a glass lens 2, a retaining ring 3, a first teflon washer 4, a first internal flange 5, a second internal flange 6, a high temperature silicone seal 7, a second teflon washer 8, a ceramic filter element 9, a first set of threads to accept the retaining ring 10, a second set of threads 11 to accept the mouth of a container 13 and a desiccant 12.

The glass lens 2, which rests on the first washer 4, is secured in place by the retaining ring 3. A seal is obtained by threading the retaining ring into the first set of threads a sufficient distance to apply pressure on the lens which in turn applies pressure on the first teflon washer. The washer, which rests on the first internal flanges, is deformed by the pressure to produce a hermetic seal. Typically, this is a thin washer with a thickness of only 0.0015 inch.

The ceramic filter rests on the second flange and is secured in place by the silicone seal. The silicone surrounds the sides of the filter and an extremely thin layer, not shown, covers the upper surface only in the area where contact is made with the second flange to perform the same function as the first washer. The second teflon washer, which is nominally 0.125 inch in thickness, is press fitted into the case to secure it in place and also aid in securing the filter in place.

Pressure is applied against the first teflon washer by the retaining ring and against the second washer by the lip of the container. The teflon flows under pressure to fill minor void and accept minor protrusions in the imperfections of the surrounding surfaces, thereby providing a superior seal. The flat portion of the washer provides a seal over a wider surface than more conventional "O" ring gaskets which generally make contact at three points. The teflon also serves to cushion the lens and filter against over pressure from such sources as the retaining ring, container and shock due to normal handling of the cap.

A desiccant which changes color as a function of its humidity content such as silica gel is employed. The glass lens provides a window to view the desiccant color when the cap is secured to a container, thus avoiding the need to open the cap to determine the state of the desiccant.

The case is preferably made of aluminum to provide for high thermal conductivity. A heating period as short as 10 minutes is often sufficient to regenerate the desiccant, whereas other types of caps have required over an hour. Aluminum which is widely used in cooking utensils is known to generally not to corrode as steel does and not to adversely react with most food or pharmaceuticals. In addition, during normal use, the aluminum does not usually come in contact with the container contents. The lip of the container presses against the second teflon washer exposing the contents to only the teflon washer and the ceramic filter. Ceramic and teflon in most instances may be considered as inert materials.

The ceramic filter contains pores which are so fine that neither the desiccant nor the container contents may pass; however, moisture is easily passed through the pores and absorbed by the desiccant.

The improved sealing method and the external viewing of the desiccant state has provided a means for prolonging the period of use of the cap by a factor of as high as ten over more conventional approaches.

The case is a simple surface of revolution with all components being concentrically located about the axis of revolution of the case. This construction not only reduces cost, but provides a sturdy device not subject to warping or distortion from use or temperature changes, thus aiding in maintaining the seal over prolonged periods.

Having described my invention, I claim:

1. A desiccant cap comprising:
   (a) a case of high thermal conductivity material having a cylindrical opening which passes completely through the case,
   (b) a first internal annular flange located adjacent a first end of said opening and concentrically oriented with said opening,
   (c) a second annular flange located adjacent the second end of said opening and concentrically oriented with said opening,
   (d) a first set of thread located within said opening and extending from the first flange to the first end of said opening,
   (e) a first washer shaped gasket having the approximate outside diameter of said opening and an inner diameter approximately equal to the inner diameter of said flange, said washer being supported by the outer side of said first annular flange,
   (f) a disc shaped transparent member having the approximate outside diameter of case opening positioned on said first washer,
   (g) a disc shaped retaining ring having a concentric opening and threads on its outer curved surface to mate with said first set of threads, said ring being threaded into said first set of threads to place pressure against and secure in place transparent member, and said disc shaped gasket,
   (h) a disc shaped filter supported by the outer side of said second flange, said filter being of ceramic with fine pores to provide a means of passing humidity while preventing interaction or commingling of the desiccant or the filter with the container contents,
   (i) a high temperature silicon rubber sealant around the outer edge of said filter and on the surface in contact with said flange,
   (j) a second washer shaped gasket, with a concentric opening, positioned about the periphery of said filter on the side opposite the second flange, said second gasket having a diameter exceeding that of the opening, requiring a force fit to place it against said filter, said forced fit aiding in securing said filter to said second flange,
   (k) a second set of threads located within said opening extending from said second gasket to the second end of said opening, said second set of threads accepting threads about the outside of the mouth of a container, whereby the lip about the container mouth exerts pressure against said second gasket to create a hermetic seal to the container, and
   (l) a desiccant, which indicates moisture content by color, located in a chamber formed by the opening in said casing, and bounded at either end by said transparent member and said filter.

2. A cap as claimed in claim 1, wherein
   (a) said gaskets are of teflon to provide for cold flow sealing under the pressure applied by said ring and container.

3. A cap as claimed in claim 1, wherein
   (a) said case is of aluminum to provide high thermal conductivity and minimize corrosion and interaction with the container contents.

* * * * *